Patented Sept. 3, 1929.

1,727,174

UNITED STATES PATENT OFFICE.

CARL MÜLLER, OF MANNHEIM, AND FRANZ KRÄGELOH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PRODUCTION OF AMMONIA FROM ITS ELEMENTS.

No Drawing. Application filed March 14, 1928, Serial No. 261,700, and in Germany March 16, 1927.

As is well known the catalytic production of ammonia from its elements is affected, in a highly adverse manner, by the presence of impurities in the initial gas, and more especially by sulfur, phosphorus, arsenic, or compounds of the same, and carbon monoxid.

We have now found that excellent yields of ammonia are obtained, by passing the nitrogen-hydrogen mixture, which may contain impurities of any kind, prior to the catalytic treatment, and under ordinary or elevated pressure, over complex metallic compounds, preferably free from or low in oxygen, especially double cyanides, at temperatures preferably below 450° C. and generally speaking below the temperature of the ammonia catalyst. These purifying masses may be situated either in a separate or in the same chamber as the ammonia catalyst, in the latter case, preferably, by arranging above the catalyst a layer of the purifying material, which is maintained at a lower temperature than the said catalyst. The complex metallic compounds may be more or less extensively decomposed beforehand by being heated, and they may also contain admixtures of other substances. Purifying masses which according to the present invention are especially suitable consist of double cyanides containing metals of the alkalis or alkaline earth, which are equivalents for the purposes of the present invention in the molecule.

The following example will further illustrate the nature of the said invention which however is not limited thereto.

Example.

A mixture of hydrogen and nitrogen containing small quantities of sulfur compounds, carbon monoxid, oxygen and water vapor as impurities, is passed, under a pressure of 200 atmospheres, through a pressure-proof tube, heated to 250° C. and charged with anhydrous potassium-aluminium ferrocyanide, the mixture being then passed through a second tube which contains an activated iron catalyst, for example iron with aluminium oxid and potassium oxid, and is heated to 450° C. The yields of ammonia are substantially higher than when the ordinary purifying masses are used.

The said double cyanide may be replaced by other complex metallic compounds capable of taking up the impurities at the working conditions employed, more especially those which contain metals of the alkalis or alkaline earths in the molecule.

When the production of ammonia is effected in a circulatory process under pressure as usual, and the employment of water or aqueous solutions for absorbing the ammonia is dispensed with, the ammonia being therefore separated, as for example, by cooling, it is usually sufficient to subject the freshly introduced gas to purification, though, in some special cases, the said method of purification may also be adopted for the gas in circulation.

What we claim is:—

1. In the catalytic synthesis of ammonia from its elements, the step of purifying the mixtures of nitrogen and hydrogen containing small quantities of sulfur compounds, carbon monoxid, oxygen and water vapor as impurities prior to the catalytic treatment by passing the said gas mixture over a purifying mass, comprising anhydrous potassium aluminium ferrocyanid which has a lower temperature than the catalyst.

2. In the catalytic synthesis of ammonia from its elements, the step of purifying the mixtures of nitrogen and hydrogen containing small quantities of sulfur compounds, carbon monoxid, oxygen and water vapor as impurities prior to the catalytic treatment by passing the said gas mixture over anhydrous potassium aluminium ferrocyanid having a temperature of about 250° C. at a pressure of 200 atmospheres.

In testimony whereof we have hereunto set our hands.

CARL MÜLLER.
FRANZ KRÄGELOH.